United States Patent
Freedman et al.

(10) Patent No.: US 9,549,156 B2
(45) Date of Patent: Jan. 17, 2017

(54) DYNAMIC ALLOCATION OF VIDEO RESOURCES

(71) Applicant: Bank of America Corporation, Charlotte, NC (US)

(72) Inventors: James David Freedman, Charlotte, NC (US); Tyler R. Johnson, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/065,100

(22) Filed: Mar. 9, 2016

(65) Prior Publication Data

US 2016/0191857 A1 Jun. 30, 2016

Related U.S. Application Data

(63) Continuation of application No. 13/443,377, filed on Apr. 10, 2012, now Pat. No. 9,317,842.

(51) Int. Cl.
| | |
|---|---|
| *H04N 7/18* | (2006.01) |
| *G06Q 20/10* | (2012.01) |
| *H04N 7/14* | (2006.01) |
| *G07F 19/00* | (2006.01) |

(52) U.S. Cl.
CPC .......... *H04N 7/181* (2013.01); *G06Q 20/1085* (2013.01); *G07F 19/211* (2013.01); *H04N 7/147* (2013.01)

(58) Field of Classification Search
None
See application file for complete search history.

(56) References Cited

U.S. PATENT DOCUMENTS

| | | | | |
|---|---|---|---|---|
| 5,920,338 A | * | 7/1999 | Katz | G07G 3/00 348/150 |
| 6,199,754 B1 | | 3/2001 | Epstein | |
| 6,726,094 B1 | * | 4/2004 | Rantze | G06Q 20/20 235/379 |
| 7,415,417 B2 | * | 8/2008 | Boyer | G06Q 30/016 705/346 |
| 7,806,316 B1 | * | 10/2010 | Torres | G07F 19/20 235/379 |
| 7,814,016 B2 | | 10/2010 | Pranger | |
| 8,570,375 B1 | * | 10/2013 | Srinivasan | G06Q 20/20 235/383 |
| 2003/0076849 A1 | | 4/2003 | Morgan et al. | |
| 2003/0105685 A1 | | 6/2003 | Millikan | |

(Continued)

*Primary Examiner* — Frederick Bailey
(74) *Attorney, Agent, or Firm* — Banner & Witcoff, Ltd.; Michael A. Springs

(57) ABSTRACT

Video transaction machines (VTMs) facilitate communications and transactions between customers of a financial institution and video transaction resources, such as video agents, by establishing a video session between a VTM and a video agent workstation. After a computing device of the financial institution receives information identifying the customer, VTM, or VTM location requesting the services of a video agent, the computing device may place the customer in one or more virtual queues based on an overall visit time at the VTM location. In order to maintain a visit time at the VTM location below a predetermined visit time threshold, the controller may prioritize transactions at VTMs with longer visit times over transactions at VTMs with shorter visit times.

20 Claims, 8 Drawing Sheets

(56) References Cited

U.S. PATENT DOCUMENTS

| | | |
|---|---|---|
| 2003/0107649 A1 | 6/2003 | Flickner et al. |
| 2003/0197782 A1* | 10/2003 | Ashe ................. G07G 1/14 348/150 |
| 2005/0039214 A1 | 2/2005 | Lorenz et al. |
| 2005/0228766 A1 | 10/2005 | Roberts et al. |
| 2006/0167891 A1* | 7/2006 | Blaisdell ............ G06F 11/3495 |
| 2007/0253595 A1 | 11/2007 | Sorensen |
| 2008/0074496 A1* | 3/2008 | Venetianer ......... G06K 9/00335 348/150 |
| 2008/0300956 A1 | 12/2008 | Nishikawa et al. |
| 2010/0131340 A1 | 5/2010 | Brown et al. |
| 2012/0281094 A1 | 11/2012 | Forshaw |
| 2013/0018788 A1* | 1/2013 | Johnson ............... G06Q 20/18 705/43 |
| 2013/0027561 A1 | 1/2013 | Lee et al. |
| 2013/0030875 A1* | 1/2013 | Lee .................. G06Q 10/06311 705/7.38 |

\* cited by examiner

|   | (HP)<br>VTM A | (LP)<br>VTM B | (LP)<br>VTM C | (LP)<br>VTM D | (N)<br>VTM E | (PREF)<br>VTM F |
|---|---|---|---|---|---|---|
| 1 | A1 | B1 | C1 | D1 | E1 | F1 |
| 2 | A2 | B2 | C2 | D2 | E2 |  |
| 3 | A3 |  |  |  | E3 |  |
| 4 | A4 |  |  |  |  |  |
| 5 | A5 |  |  |  |  |  |
| 6 | A6 |  |  |  |  |  |
| 7 | A7 |  |  |  |  |  |

FIG. 7

|   | VA 1 | VA 2 | VA 3 | Q1 | Q2 | Q3 |
|---|---|---|---|---|---|---|
| 1 | A1 | B1 | C1 | D1 | E1 | F1 |
| 2 | D1 | E1 | F1 | A2 | B2 | C2 |
| 3 | A2 | B2 | C2 | D2 | E2 |  |
| 4 | D2 | E2 | A3 |  |  |  |
| 5 | A4 | E3 |  |  |  |  |
| 6 | A5 |  |  |  |  |  |
| 7 | A6 |  |  |  |  |  |
| 8 | A7 |  |  |  |  |  |

FIG. 8

|   | VA 1 | VA 2 | VA 3 | Q1 | Q2 | Q3 |
|---|---|---|---|---|---|---|
| 1 | F1 | A1 | B1 | C1 | D1 | E1 |
| 2 | A2 | D1 | E1 | C1 | B2 |  |
| 3 | A3 | B2 | C1 | D2 | E2 |  |
| 4 | A4 | E2 | D2 | C2 |  |  |
| 5 | C2 | A5 | E3 |  |  |  |
| 6 | A6 |  |  |  |  |  |
| 7 | A7 |  |  |  |  |  |
| 8 |  |  |  |  |  |  |

FIG. 9

DYNAMIC ALLOCATION OF VIDEO RESOURCES

CROSS-REFERENCE TO RELATED APPLICATIONS

This application is a continuation of U.S. patent application Ser. No. 13/443,377 filed on Apr. 10, 2012 and entitled "DYNAMIC ALLOCATION OF VIDEO RESOURCES." The prior application is herein incorporated by reference in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used by an organization, such as a financial institution or other entity, to facilitate efficient allocation of video services by reducing visit times at video service machines.

BACKGROUND

Customers of a financial institution often complete financial transactions through bank tellers or automated devices, such as automated teller machines (ATMs). Financial transactions may include, for example, funds deposits and withdrawals, funds transfers, general account inquiries, and/or account servicing. In order to conduct financial transactions through bank tellers, customers typically must visit bank locations, which may be inconvenient for some customers. Furthermore, customers might have to wait in line for an available bank teller. While traditional ATMs might be more convenient than bank tellers for some financial transactions, customers might not be able to conduct all of their sales, servicing, and/or transactions through traditional ATMs.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Adding video capabilities to an ATM-like device may enable additional sales, servicing, and/or transactions beyond the capabilities of traditional ATMs. Some aspects as disclosed herein are directed to, for example, a system and method of receiving a request, from a video transaction device, to connect to a video agent. In additional aspects of the disclosure, the system and method may determine whether a visit time for the video transaction device exceeds a predetermined visit time threshold. In response to determining that the visit time for the video transaction device exceeds the predetermined visit time threshold, the system and method may assign the request to a default queue and/or classify the request as a high priority request.

Some aspects as disclosed herein are also directed to, for example, a system and method of receiving, from a first video transaction device, a request for a video transaction resource. In additional aspects, the system and method may determine that a visit time associated with the first video transaction device exceeds a predetermined visit time threshold. In response to determining that the visit time associated with the first video transaction device exceeds the predetermined visit time threshold, the system and method may prioritize the request for the video transaction resource from the first transaction device above a request for a video transaction resource from a second video transaction device.

BRIEF DESCRIPTION OF THE DRAWINGS

The present disclosure is illustrated by way of example and not limited in the accompanying figures in which like reference numerals indicate similar elements and in which:

FIG. 7 illustrates an example of physical queues at one or more transaction locations in which various aspects of the disclosure may be implemented.

FIG. 8 illustrates an example of a first-come, first-served queuing model in which various aspects of the disclosure may be implemented.

FIG. 9 illustrates an example of a dynamic routing queuing model in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
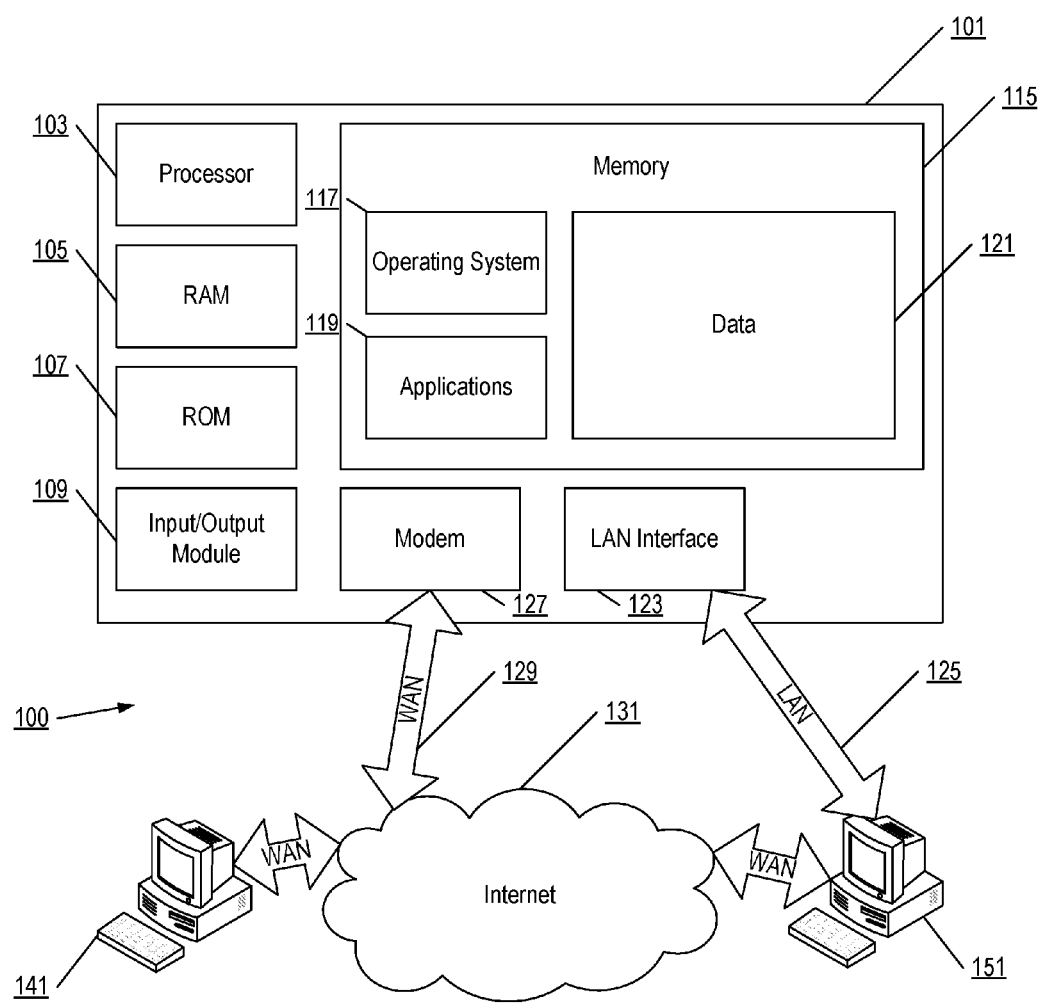
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure (including the system of FIG. 1) include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
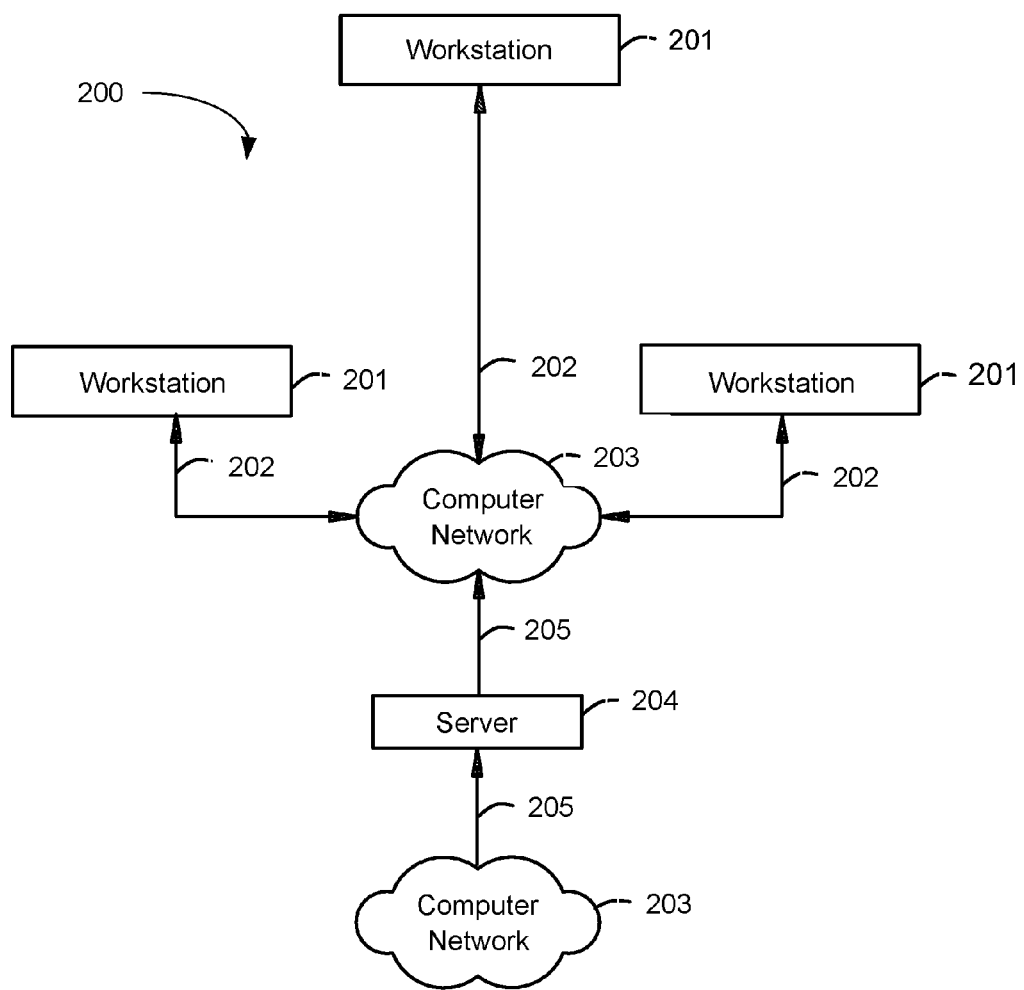
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
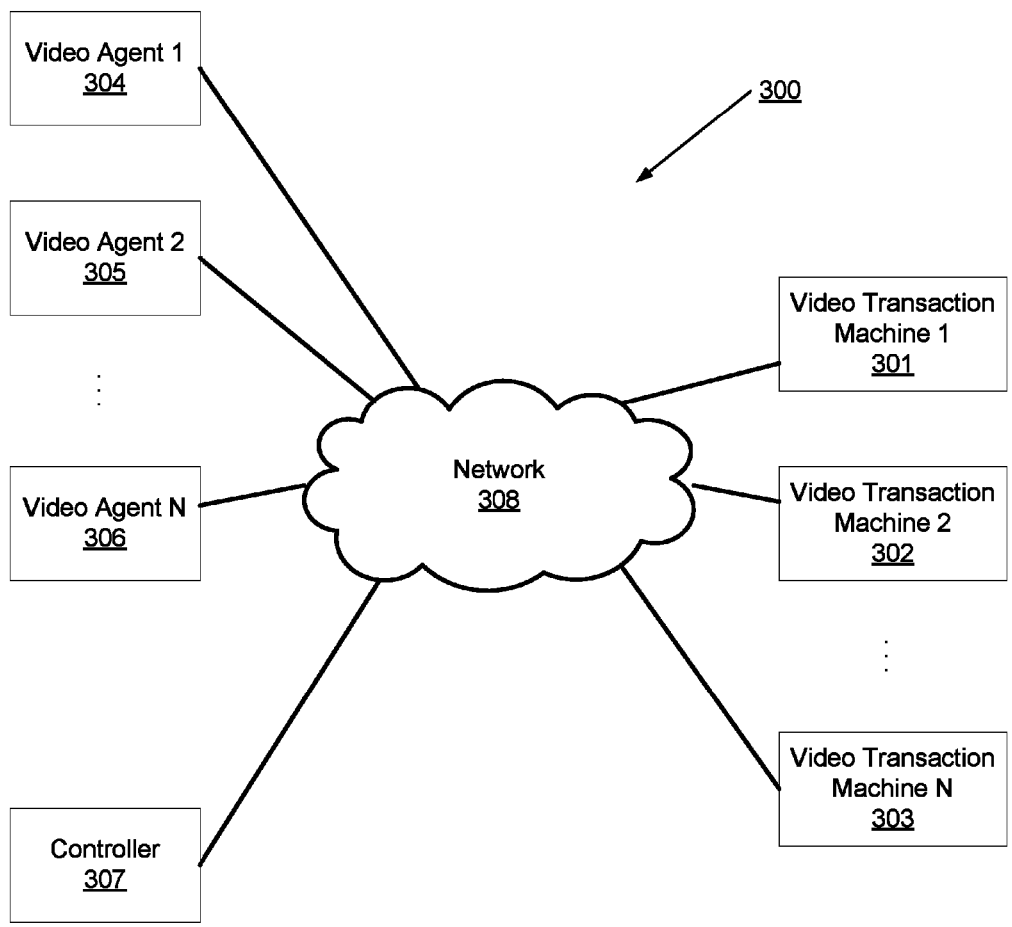
FIG. 3 illustrates an example system of video transaction machines, video agents, and a controller in which various aspects of the disclosure may be implemented.

FIG. 3 illustrates an example video transaction system 300 of a plurality of video transaction machines (VTMs) 301-303, a plurality of video agents 304-306, and one or more controllers 307 in which various aspects of the disclosure may be implemented. VTMs 301-303 generally facilitate communications and/or transactions among a financial institution, users (e.g., customers), and/or third parties. Financial transactions may include, for example, fund deposits, fund withdrawals, check cashing, fund advances, funds transfers, payments, general account inquiries, cardless authentications, and/or account servicing. A VTM may be self-service device having input, audio, and/or video interaction capabilities. For example, VTMs may include various input devices such as keypads, touchscreens, wireless readers (e.g., RF scanners/readers), optical readers (e.g., barcode scanners), and/or card readers (e.g., bank card readers) for users to provide the VTM or financial institution with information (e.g., user information). A VTM may also have various audio and/or video interaction devices, including video cameras, microphones, display screens, and/or speakers to facilitate live audio and/or video communications between a user and a human or computer agent of the financial institution, referred to herein as a video agent. Thus, in addition to self-service functionality, VTMs may also provide a VTM user with services that are not limited to self-service functionality through use of the video agent. While the term "video agent" is used herein, it is to be understood that communications with the video agent need not necessarily include video communications, but may include audio communications alone, video communications alone, simultaneous audio and video communications, and/or any other types of communications. Where an example discussed herein refers to a video communication or connection, or a video transaction service, it is to be understood that this may additionally or alternatively be an audio communication, audio connection, or audio transaction service.

VTMs may be distributed all over the country or the world in various locations, such as in banks, convenience stores, grocery stores, outdoors, and the like. Thus, VTMs may provide users with full service and convenient banking services.

Customers of a financial institution, or any other users, may use the VTMs to interact with various video servicing resources of the financial institution, such as video agents 304-306. By interacting with video agents through VTMs, customers may perform transactions similar to transactions performed in person with a bank teller. A video agent may utilize a computing device (e.g., computing device 101) to interact with the user at the VTM. The computing device may be, for example, one of workstations 201 illustrated in FIG. 2. The video agent's workstation 201 may have at least some similar functionality as VTMs. For example, the workstation 201 may have various input devices as previously described. The workstation 201 may also have audio and/or video interaction devices, including video cameras, microphones, display screens, and/or speakers.

VTMs 301-303 and video agents 304-306 may communicate via audio and/or video through one or more networks 308. It is to be understood that, while only three VTMs and three video agents are explicitly shown in FIG. 3, there may be many more VTMs and/or video agents, as desired. Moreover, all of the video agents may be able to interact with any of the VTMs, VTM users, and/or VTM user transaction types. Alternatively, the video agents may each be able to interact with only a certain subset of the VTMs, a certain subset of VTM users, and/or a certain subset of VTM user transaction types. The video agents and the VTMs may be geographically dispersed in any configuration desired.

One or more controllers 307 may facilitate the audio and/or video connection between a VTM and a video agent. For example, as will be described in further detail below, controller 307 may receive requests for audio and/or video transaction services from VTMs 301-303, receive information relating to each VTM location, determine the routing behavior for users to video agents, generate queues based on received information and user and/or location priority, and/or route users to video agents based on the user's position and/or classification in the queues. Controller 307 may be implemented as, e.g., computing device 101.

The steps that follow in the remaining Figures may be implemented by one or more of the components in any of FIGS. 1, 2, and 3 and/or other components, including other computing devices. As a general overview, an example process for initiating and completing a financial transaction using a video transaction system will now be described. A VTM user (which may include, but is not limited to, a customer of a financial institution) may arrive at a location having one or more VTMs. If other users are present, the user may wait in line for an available VTM. While a user is waiting, the user may take a location in a physical queue, as will be described in further detail in the examples that follow. The physical queue may be for a single VTM or it may be a shared physical queue for a group of VTMs at the location.

When a VTM (e.g., VTM 301) at the location is available, the user may approach the available VTM and conduct a financial transaction. During the financial transaction, the user may desire to request video transaction services. In making the request, the user and/or the VTM may be required, for example, to provide information identifying the user (e.g., insertion of a bank card, providing a bank account number, and the like). Upon receiving or otherwise obtaining the identifying information, the VTM 301 may transmit a request to controller 307 for video transaction services, such as a request for connection to a video agent (e.g., one of a pool of video agents 304-306). Alternatively, VTM 301 may transmit a request to controller 307 for video transaction services, such as a request for connection, without requiring the user to provide identifying information. If one of the video agents 304-306 is available, controller 307 may connect the user to the video agent, for example, by establishing a communication channel (e.g., a video session) between VTM 301 and a workstation of the video agent. If a video agent is not available (and in some instances, if a video agent is not immediately available), controller 307 may classify and place the user transaction and/or VTM 301 in one of several virtual queues, as will be described in further detail in the examples that follow. Controller 307 may determine which virtual queue to place the user transaction into and how to classify the transaction by evaluating one or more factors, for example, estimated overall visit times, estimated physical queue wait times, estimated virtual queue wait times, transaction times, number of users in the virtual queues, number of users in the physical queues, and the like, as will be described in further detail in the examples that follow. When the user is next in a virtual queue and a video agent is available, controller 307 may connect the user's VTM to the available video agent.

If video transaction resources are overloaded (e.g., a high number of users waiting for a low number of video agents), controller 307 may temporarily disable video transaction resources and/or otherwise limit the number of additional requests for video transaction resources until the load of the resources decreases. For example, if an estimated average or maximum virtual queue wait time for a video agent as determined by controller 307 exceeds a predetermined virtual queue wait time threshold (e.g., 3 minutes), controller 307 may temporarily disable video transaction resources for one or more additional users approaching the VTMs until the estimated virtual queue wait time drops below the predetermined virtual queue wait time threshold.

Controller 307 may attempt to decrease overall visit times (which may include physical wait times, virtual wait times, and/or transaction times) at overloaded VTMs by distributing visit time loads across other VTMs. For example, controller 307 may allow visit times to slightly increase at VTMs that have relatively short visit times (e.g., visit times below a predetermined visit time threshold, such as a predetermined low end threshold) while attempting to decrease visit times at overloaded VTMs having relatively long visit times (e.g., visit times above a predetermined high end threshold). A predetermined low end visit time threshold (e.g., 2 minutes) may be lower than a predetermined high end visit time threshold (e.g., 20 minutes). By distributing visit time loads across various VTMs, controller 307 may bring the visit time for each VTM to within the predetermined high end and low end visit time thresholds. For example, if the low end visit time threshold is 2 minutes and the high end visit time threshold is 20 minutes, controller 307 may attempt to bring the visit time at each VTM to below 20 minutes by slightly increasing the visit times for one or more VTMs having visit times below 2 minutes. Visit times may depend on one or more factors, for example the number of users currently interacting with a video agent through a VTM, the number of video agent resources available to service users, service terms associated with each user and video agent interaction, and/or latency times associated with hardware, software, and/or communication networks of the video transaction system.

Controller 307 may control the visit times by deciding which of several queues to classify a user transaction into. Controller 307 may track several queues, including one or more physical queues and/or one or more virtual queues. Physical queues may include users waiting (e.g., in a line of users at a VTM location) to access a VTM. For example, if five users are waiting in line at a particular location (e.g., a bank) for a VTM, controller 307 may keep track of the length of the line at the physical queue for the location as including the five users. The physical queue may or may not include the user at the VTM, as desired. Controller 307 may similarly track physical queues for other VTM locations. Controller 307 may attempt to reduce the visit time of users in larger physical queues by allowing the visit time of users in smaller physical queues to slightly increase. The increase in visit time may be distributed among one or more VTMs at one or more locations. By managing physical queues, users of the video transaction system may be provided with timely, efficient, and manageable video transaction service.

Controller 307 may manage physical queues based on information received from VTM locations. For instance, controller 307 may manage a physical queue at a VTM location based on real-time data received from the VTM location. To obtain information about the physical queue, one or more sensors (which may be of one or more sensor types) that collect information about the physical queue, such as the number of users at the VTM location (e.g., waiting in line), may be installed at the VTM location. Such sensors may include, e.g., one or more image sensors (e.g., cameras, infrared and/or thermal imagers, and the like), pressure sensors, motion sensors, heat sensors, microphones, or other types of presence sensors, and the like, and video or other analytics software (e.g., face/body detection, and the like) may be used to detect the number of users waiting to access a VTM. Controller 307 may also detect users in the physical queue based on sensors located on one or more of the users' devices, such as a portable device. For example, controller 307 may detect the presence of a user using GPS, Wi-Fi, Bluetooth, NFC signals, and the like associated with the user's mobile device, such as a cell phone (e.g., a cell phone with GPS, Wi-Fi, Bluetooth, NFC signals, and the like capabilities). The sensors may also be utilized as people counting devices to count, for example, the number of users entering a VTM location and/or entering a line to access a VTM. Furthermore, the sensors may track the number of users in real-time and/or provide controller 307 with real-time information. The video transaction system may additionally or alternatively utilize human employees of the financial institution at the VTM location (or remotely located and obtaining information from the sensors) to provide information on the number of users to the video transaction system and/or controller. In some embodiments, controller 307 may receive raw data from the VTM location (e.g., images of the VTM location, including users in line) and determine the number of users in line at the VTM location based on the received raw data. Alternatively, the number of users in line may be computed locally at the VTM location, such as by a computing device located at the VTM location, and data indicating the results may be transmitted to controller 307.

Controller 307 may further manage a physical queue based on historical and/or predictive information on VTM locations. Sensors and/or employees may collect information on the number of users waiting in a physical queue for a VTM at various locations. This information may be collected intermittently, such as at predetermined intervals (e.g., every second, hour, day, and the like). A computing device such as controller 307 may cause the collected information to be stored, and may utilize the stored information to recognize patterns. For example, the computing device may recognize that Fridays from 5 PM to 6 PM at one or more VTM locations are typically very busy (e.g., approximately ten users on average are in line on Fridays from 5 PM to 6 PM, as opposed to, say, about three users on average at other times/time periods). The computing device may similarly recognize patterns for other time slots throughout the hour, day, week, and the like. The computing device may also factor in specific scheduled or otherwise predictable events that might influence the number of users wanting to perform video transactions. For example, the computing device may recognize that users are likely to utilize VTMs on paydays (e.g., the first or $15^{th}$ of the month). Alternatively, employees of the financial institution may manually provide (e.g., inputted by the employee via an interface device) information on the events to the computing device.

The computing device may generate predictive models of the number of users at one or more VTM locations based on recognized patterns. Controller 307 may use the predictive models to predict the number of users in line at any given time. For example, if the predictive model indicates that, on average, ten users are in line at VTM 301 on Fridays at 5 PM, controller 307 may predict that ten users will be in line this upcoming Friday at 5 PM and manage the physical queue accordingly. Predictive models may be continuously refined by continuously collecting and updating information on the number of users at VTM locations.

Virtual queues may include zero, one, or more users that have requested video transaction resources 304-306 via the VTMs 301-303. For example, controller 307 may add a user transaction to a virtual queue after the user provides information identifying the user and the user is authorized to access video transaction resources. In general, controller 307 may connect a user transaction at the top (or front) of a virtual queue to a video agent when the video agent becomes available to fulfill the user transaction request. Controller 307 may generate and/or maintain several virtual queues, such as preferred virtual queues and/or default virtual queues. In some embodiments, controller 307 may prioritize user transactions in the preferred virtual queues over user transactions in the default virtual queues. User transactions in the preferred virtual queues may, in general, have shorter wait times (e.g., time from initiating a request for video agent services to time of connection to a video agent) than user transactions in the default virtual queues. User transactions may be placed in a preferred virtual queue if, e.g., the user is a preferred user of the financial institution (e.g., an elite/VIP user, a user with special account privileges, and the like). User transactions may also be placed in a preferred virtual queue if the VTM that the user is interacting with is a preferred VTM or located in a preferred location. For example, if terms of a service agreement between a VTM location and the financial institution include a term that prioritizes VTMs at the VTM location over other VTM locations, user transactions requesting video transaction services at the preferred VTM locations may be placed in a preferred virtual queue.

Classification and/or queue placement may be performed at any point in time, including at session initiation (e.g., when the user begins using the video transaction device), at transaction initiation (e.g., when the user begins choosing the transaction type), at video initiation (e.g., when the user chooses to engage a video resource), and/or after the user is authorized (e.g., when controller 307 authorizes the user to use a video transaction device). Moreover, queue placement may have specific timings dictating how long transactions initially remain in a queue based on the point in time that they were classified/placed in a queue. For example, if a user transaction is placed in a preferred queue at session initiation, the user transaction classified as preferred may initially remain in the queue position for 30 seconds. If the user provides additional information, chooses a transaction type, decides to engage with a video agent, and the like. within 30 seconds of the initial queue placement, the user transaction may remain in the initial queue position. If the user does not provide additional information, choose a transaction type, decide to engage with a video agent, and the like. within the initial 30 seconds, the user transaction may lose its initial queue position, and another queue placement may be performed when the user provides the additional information, chooses a transaction type, decides to engage with a video agent, and the like.

As will be discussed in further detail in the examples below, user transactions may additionally (or alternatively) be classified as high priority transactions if the average and/or maximum visit time at a VTM or group of co-located VTMs exceeds a predetermined high end threshold. User transactions may be classified as low priority transactions if the average and/or maximum visit time at a VTM or group of co-located VTMs is below a predetermined low end threshold. The maximum visit time at a VTM may be the visit time for the last user in line for the VTM. For example, the determined maximum visit time may be six minutes if the last user in in line is expected to wait six minutes. The average visit time at a VTM may be the average visit time for all users in line for the VTM. For example if the visit time for the first user in line is two minutes, the visit time for the second user in line is four minutes, and the visit time for the third user in line is six minutes, the determined average visit time may be 4 minutes.

User transactions classified as high priority and/or low priority may be included in the default virtual queues, which as previously described may have longer visit times than preferred visit queues. For example, if a user transaction is not placed in a preferred virtual queue, controller 307 may place the user transaction in a default virtual queue. Classification and/or queue placement may be performed at any point in time, including at session initiation (e.g., when the user begins using the video transaction device), at transaction initiation (e.g., when the user begins choosing the transaction type), at video initiation (e.g., when the user chooses to engage a video resource), and/or after the user has been authorized.

Figure 4:
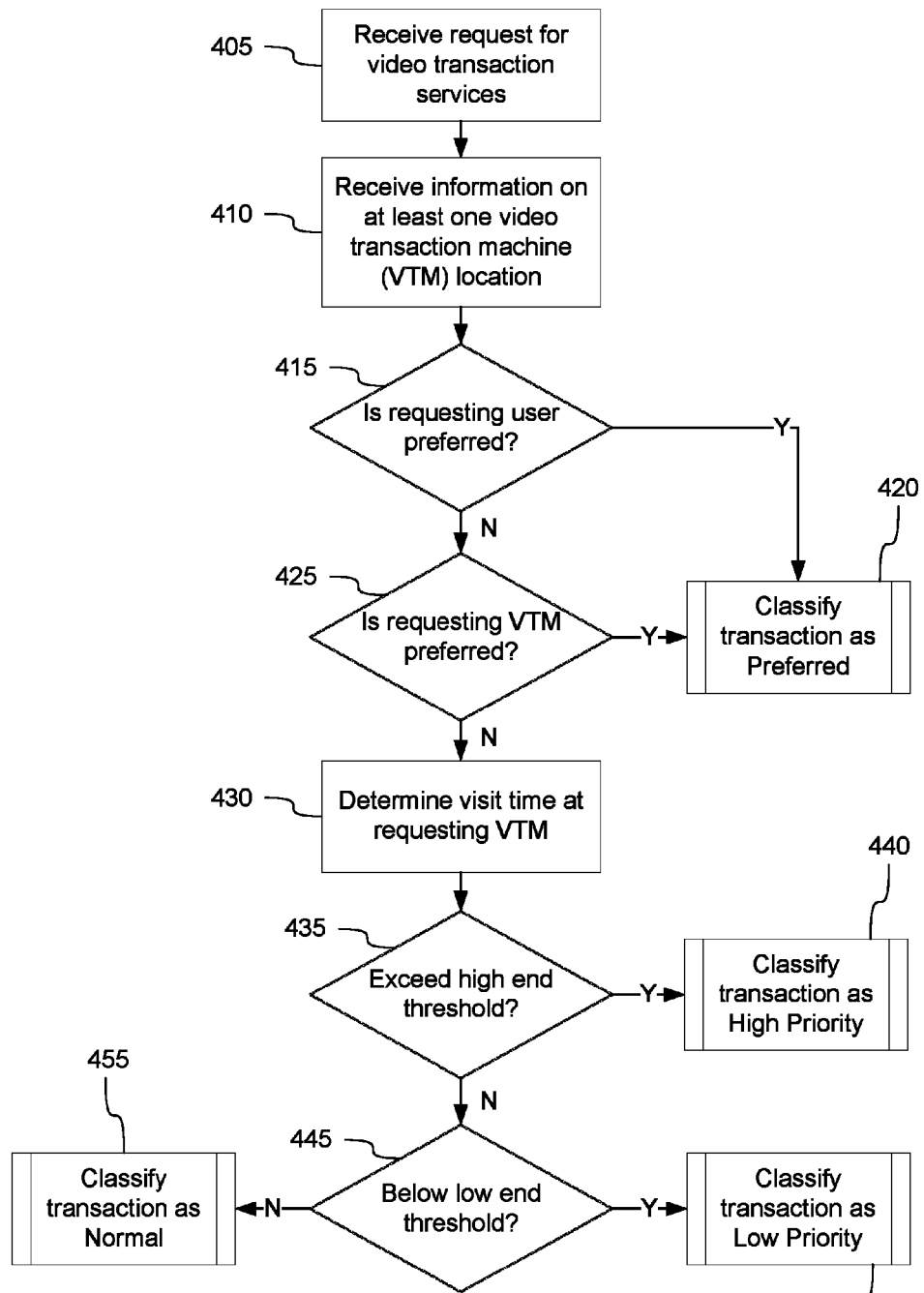
FIG. 4 illustrates an example of at least a portion of a flow diagram for classifying video transactions in which various aspects of the disclosure may be implemented.

FIG. 4 illustrates an example of at least a portion of a flow diagram for classifying video transactions in which various aspects of the disclosure may be implemented. While various steps are described as being performed by particular elements, such as controller 307, these steps may alternatively be performed by other elements in the system, as desired. In step 405, controller 307 may receive a request for video transaction services from a user through a VTM. The request may include information identifying the user (e.g., a user identifier, bank account number, whether the user is a preferred customer, and the like), information identifying the VTM, and/or information identifying the location of the VTM (e.g., time zone, market, whether the VTM and/or location is preferred, and the like). The request may also identify the type of transaction (e.g., funds deposits, funds withdrawals, funds transfers, general account inquiries, and the like) that the user intends to conduct through a video agent and/or any other related transaction information (e.g., transaction identification number, time stamp, and the like).

A user may temporarily or permanently be granted an elevated status. For example, a user may have previously purchased (or otherwise have received) elevated status membership from a financial institution. When requesting video transaction services, the user may provide a unique identifier (e.g., a code, such as an alphanumeric code, provided by the financial institution) identifying the elevated status to the VTM. Alternatively, a computing device (such as controller 307) associated with the financial institution may store an indicator of the elevated status with the user's account, in which case the user might not need to provide a separate identifier for the elevated status. As will be discussed in further detail in the examples below, controller 307 may classify an elevated status user transaction as preferred, as high priority, or otherwise permit the user transaction to be prioritized over transactions that have not been granted elevated status (e.g., to "jump" non-elevated status transactions in the virtual queues).

In step 410, controller 307 may receive information on at least one VTM location, including information on the VTM location having the VTM that requested video transaction services in step 405. For example, controller 307 may receive information identifying the number of users in line (e.g., the length of the physical queue) for the VTM or for a group of VTMs at the location. Controller 307 may also receive information identifying the wait time for individual users at the VTM or a wait time for the VTM, such as the average, mean, minimum, and/or maximum wait time. The wait time may be the time that a user at the VTM spends in a virtual queue (e.g., the time from when the user requests video transaction services to the time when the user is connected to a video agent, such as a video connection wait time).

Controller 307 may receive information identifying the transaction time for individual users at a VTM or an average transaction time for users at the VTM. The transaction time may be the duration of a video transaction session (e.g., the time from when a user is connected to a video agent to when the requested video transaction services are completed). Several factors may affect transaction times. For example, complexity of transactions at the VTM may affect the transaction time. A more complex transaction (e.g., a deposit to multiple accounts that might not be linked to the user's profile and might require additional authorization) may take more time than a less complex transaction (e.g., cashing a check by a user that has already been authenticated). Transaction times may also vary based on the type of VTM. For example, transactions at drive-up VTMs may take more time than walk-up VTMs if users at the drive-up VTMs take longer to provide the VTM with requested information than users at walk-up VTMs. Instead of receiving information identifying transaction times for individual users and/or VTMs, controller 307 may receive information identifying average transaction times across all VTMs in the video transaction system. The statistics on the transactions times experienced at one or more VTMs may be weighted or otherwise adjusted to take into account transaction complexities.

Controller 307 may also receive information identifying the actual or average (e.g., mean) time between video agent requests at various VTM locations. For example, VTMs at less busy locations or during less busy times may receive requests for video agents every 30 minutes. On the other hand, VTMs at busier locations or during busier times may receive requests for video agents every 5 minutes. Not all transactions may involve a video agent; some users may want assistance from a video agent, while others may desire to perform a transaction on a fully self-service basis. While step 410 is illustrated in FIG. 4 as following step 405 (receive request for video transaction services), step 410 may precede step 405. For example, controller 307 may receive information on various VTM locations independent of the requests for video transaction services. Controller 307 may receive the information on various VTM locations at predetermined times and/or predetermined intervals. As previously discussed, the received information may be real-time information (e.g., the number of users detected by a sensor at the VTM location) or predictive information (e.g., a number of users expected to be at the VTM location based on historical information and/or a predictive model).

In step 415, controller 307 may determine whether the requesting user is a preferred user based on the information provided by the user (e.g., user name, bank account number, and the like). If the user is a preferred user, controller 307 may classify the transaction requested by the user as a preferred transaction in step 420. Classifying transactions as preferred will be described in further detail with respect to FIG. 5A. If the user is not a preferred user, controller 307 may determine, in step 425, whether the requesting VTM is a preferred VTM and/or whether the requesting VTM is located at a preferred location. If the VTM or VTM location is preferred, controller 307 may classify the transaction requested by the user as a preferred transaction in step 420.

If the requesting VTM is not a preferred VTM or at a preferred location, controller 307 may proceed to step 430. In step 430, controller 370 may determine the average or maximum visit time at the VTM location. A user's visit time may be the user's overall service level wait time. For example, the visit time may be the amount of time from when the user begins waiting for a VTM to become available (e.g., when the user enters the VTM location, steps into line for a VTM, and the like) to when the user completes the user's requested video transaction services (e.g., when the user is disconnected from a video agent) and/or to when the user's complete transaction with the VTM has ended and/or when the user has physically moved away from the VTM after the complete transaction has ended.

Controller 307 may determine the average visit time for a VTM or group of VTMs based on, e.g., the users in line (C), average wait time (W), and average transaction time (T). As previously discussed, controller 307 may receive this information in, for example, step 410. Controller 307 may determine the average visit time ($V_{AVG}$) based on the following expression:

$$V_{AVG} = \frac{(T+W) \cdot \sum_{i=1}^{C} i}{C}$$

For example, assume that three customers are in line (C=3), the average wait time is 2 minutes (W=2), and the average transaction time is 3 minutes (T=3) for a VTM device. The average visit time for the VTM device ($V_{AVG}$) may be 10 minutes ((3+2)×(3+2+1)/3). Controller 307 may similarly determine the average visit time for one or more other VTMs in the video transaction service system.

Controller 307 may additionally or alternatively determine the maximum visit time for a VTM or group of VTMs. The maximum visit time may be, for example, the duration from when the last user in line for a VTM begins waiting for the VTM (e.g., when the last user steps in line or enters the VTM location) to when the last user completes a requested transaction via the VTM (e.g., when the last user is disconnected from a video agent). As a non-limiting example, assume that three users are in line for VTM 301, that the average wait time for each user is 2 minutes, and that the average transaction time for each user is 3 minutes. Further assume that the first user in line has just approached VTM 301. Controller 307 may determine that the visit time for the first user at VTM 301 is 5 minutes (i.e., 2 minute wait time+3 minute transaction time). Controller 307 may determine that the visit time for the second user in line for VTM 301 is 10 minutes (i.e., 5 minute delay time waiting for the first user to complete his or her transaction+2 minute wait time+3 minute transaction time). Controller may determine that the visit time for the third user in line for VTM 301 is 15 minutes (i.e., 10 minute delay time waiting for the first and second users to complete their transactions+2 minute wait time+3 minute transaction time). Thus, controller 307 may compute the maximum visit time for VTM 301 to be 15 minutes (i.e., the visit time for the third user). Controller 307 may determine the maximum visit time ($V_{MAX}$) based on the following expression:

$$V_{MAX} = C \cdot (T+W)$$

In the above examples, controller 307 computes visit times based on the number of users in line, the average wait time, and the average transaction time. Computation of visit times, however, may factor in other times, such as delays between when one user completes a transaction and the next user in line inputs user information, delays in resetting VTM screens, hardware and/or network issues (e.g., an overloaded network), adverse weather, registration for new users, and the like. Controller 307 may perform step 430 if a user joins or leaves the line waiting for the VTM. For example, if a sensor at a VTM location detects that a user has joined or left the line for a VTM and/or entered or left the VTM location, the VTM or a computing device at the VTM location may transmit a request to controller 307 to re-compute the average and/or maximum visit time for the VTM. The VTM or computing device may also transmit updated information on the VTM location (e.g., number of users in line, wait time, transaction time, and the like) to controller 307 in response to detecting that the user has joined the line. Controller 307 may determine the average and/or maximum visit time in manners similar to those described above. Alternatively, step 430 may be performed intermittently, such as on a periodic basis, without regard to whether users have entered or left the line.

In steps 435 and 445, controller 307 may determine whether the visit time exceeds or is below one or more predetermined visit time thresholds. The predetermined thresholds may be set by, e.g., the financial institution. The predetermined thresholds may indicate a maximum and/or minimum acceptable visit time for each user that utilizes the video transaction system to complete one or more transaction. The predetermined thresholds may be the same across all VTMs and/or VTM locations (e.g., 8 minutes for each VTM). Alternatively, VTMs and/or VTM locations may have different predetermined thresholds. For example, preferred locations and/or preferred VTMs may have lower predetermined visit time thresholds (e.g., 6 minutes) than non-preferred locations and/or non-preferred VTMs (e.g., 8 minutes). Moreover, as already discussed herein, the visit time thresholds may be dynamic—that is, they may be changed over time, such as by controller 307, in response to changing conditions, in order to better manage the physical and/or virtual queues. In some embodiments, service-level agreements between the financial institution and various VTM locations may indicate the predetermined visit time thresholds and/or range of dynamic thresholds for the various VTM locations.

In step 435, if the visit time exceeds a predetermined high end threshold, controller 307 may classify the transaction requested by the user as a high priority transaction in step 440. Controller 307 may also classify a transaction as a high priority transaction if, for example, the visit time exceeds a predetermined high end visit time threshold and if one or more other conditions are satisfied. The one or more conditions may include, e.g., whether the number of user transactions classified as high priority transactions has exceeded a predetermined number of user transactions. For example, if the number of user transactions classified as high priority transactions has not exceeded a predetermined number of user transactions and the visit time exceeds a predetermined high end visit time threshold, controller 307 may classify the user transaction as a high priority transaction. Alternatively, if the number of user transactions classified as high priority transactions has exceeded a predetermined number of user transactions and the visit time exceeds a predetermined high end visit time threshold, controller 307 may nevertheless classify the user transaction as a normal transaction, despite the visit time exceeding the high end threshold. The condition may also include whether the number of users in a physical queue has exceeded a predetermined number of users and/or whether a video session between a user and a video agent has exceeded a certain threshold time duration. The transaction may be classified as high priority by including a high priority indicator (e.g., HI, *, and the like) with the transaction identifier when the transaction is placed in a virtual queue, as will be described in further detail in the examples below. For example, the transaction identifier placed in the virtual queue may indicate: username-HI, username*, account#-HI, account#*, and the like.

In step 445, if the visit time is below a predetermined low end threshold, controller 307 may classify the transaction requested by the user as a low priority transaction in step 450. Controller 307 may also classify a transaction as a low priority transaction if, for example, the visit time is below a predetermined low end visit time threshold and if one or more other conditions are satisfied. The one or more conditions may include, e.g., whether the number of users transactions classified as low priority transactions has exceeded a predetermined number of user transactions. For example, if the number of user transactions classified as low priority transactions has not exceeded a predetermined number of user transactions and the visit time is below a predetermined low end visit time threshold, controller 307 may classify the user transaction as a low priority transaction. Alternatively, if the number of user transactions classified as low priority transactions has exceeded a predetermined number of customer transactions and the visit time is below a predetermined low end visit time threshold, controller 307 may nevertheless classify the user transaction as a normal transaction, despite the visit time being below the low end threshold. The condition may also include whether the number of users in a physical queue has exceeded a predetermined number of users and/or whether a video session between a user and a video agent has exceeded a certain threshold time duration. The transaction may be classified as low priority by including a low priority indicator (e.g., LOW, ', and the like) with the transaction identifier when the transaction is placed in a virtual queue, as will be described in further detail in the examples below. For example, the transaction identifier placed in the virtual queue may indicate: username-LOW, username', account#-LOW, account#', and the like.

If the visit time does not exceed a predetermined high end threshold (as determined in step 435) and is not below a predetermined low end threshold (as determined in step 445), controller 307 may classify the transaction as a normal transaction in step 455. The transaction may be classified as normal by including a normal priority indicator (e.g., NOR, -, and the like) with the transaction identifier when the transaction is placed in a virtual queue, as will be described in further detail in the examples below. For example, the transaction identifier placed in the virtual queue may indicate: username-NOR, username-, account#-NOR, account#-, and the like. Classifying transactions as high priority, low priority, and/or normal will be described in further detail with respect to FIG. 5B.

Figure 5A:
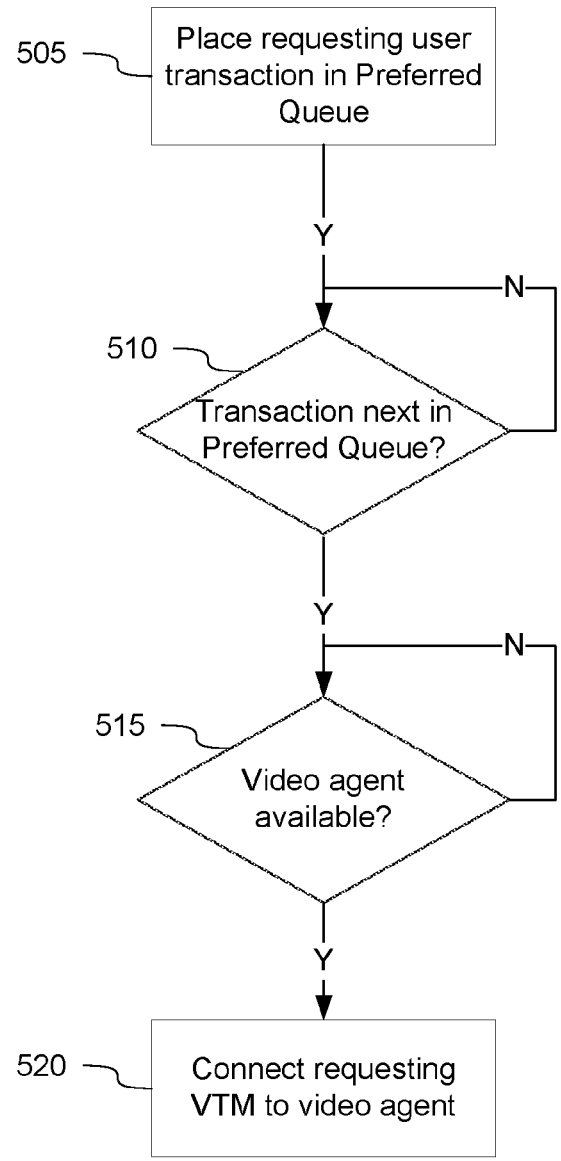
FIG. 5A illustrates an example of at least a portion of a flow diagram for handling a video transaction that has been classified as preferred, in which various aspects of the disclosure may be implemented.
Figure 5B:
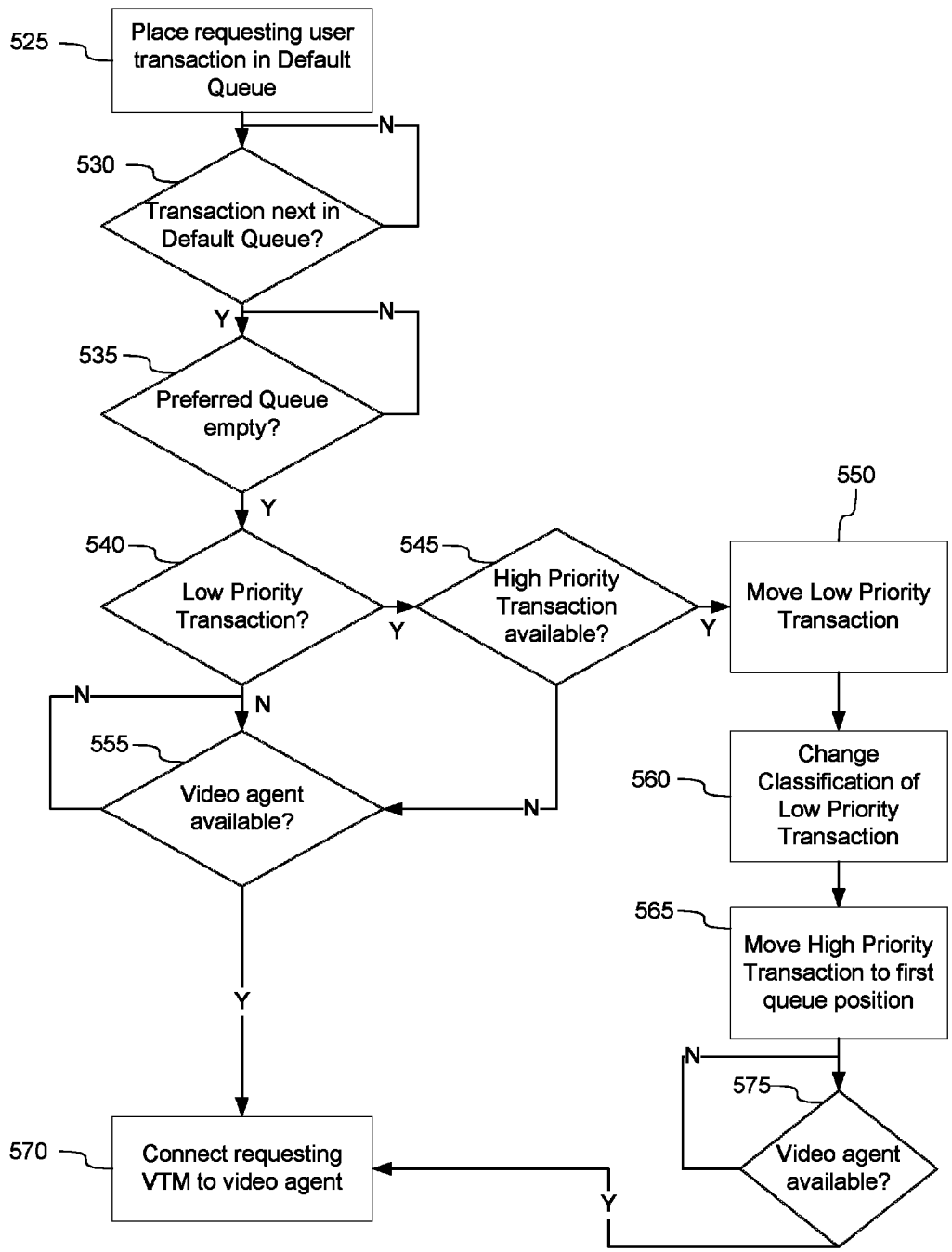
FIG. 5B illustrates an example of at least a portion of a flow diagram for handling a video transaction that has been classified as high priority, low priority, and/or normal, in which various aspects of the disclosure may be implemented.

FIGS. 5A & 5B illustrate examples of at least portions of flow diagrams for handling video transactions classified as one of a preferred transaction, a high priority transaction, a low priority transaction, and a normal transaction (e.g., steps for connecting customers to video agents). As previously described, controller 307 may generate and maintain preferred queues (FIG. 5A), and/or default queues (FIG. 5B). Users or transactions in preferred virtual queues may have priority over users or transactions in default virtual queues. Within the default queues, user transactions classified as high priority transactions may have priority over user transactions classified as low priority transactions. User transactions classified as normal transactions may have priority over user transactions classified as high priority transactions or low priority transactions.

FIG. 5A illustrates an example of at least a portion of a flow diagram for classifying a video transaction as preferred in which various aspects of the disclosure may be implemented. If controller 307 classifies a transaction as preferred (step 420), controller 307 may perform the steps illustrated in FIG. 5A. In step 505, controller 307 may place a requesting user (or VTM) in a preferred queue. For example, the user may be associated with a unique identifier (e.g., an account number, card number, user name, or other identifier that uniquely identifies the user). The VTM may similarly be associated with a unique identifier. The unique identifier of the user and/or VTM may be placed at the next available position in the queue.

The preferred virtual queue may gradually empty as users in the preferred virtual queue complete their transactions. In step 510, controller 307 may determine whether the requesting user transaction is the next transaction in the preferred queue. If the requesting transaction is not the next transaction (step 510: N), controller 307 may continue to wait until the requesting transaction is next in the preferred queue. When a user transaction is next in the preferred virtual queue (step 510: Y), controller 307 may determine whether a video agent is available in step 515. For example, controller 307 may determine that a video agent is available when a video agent is logged into the video transaction system and/or acknowledges that the video agent ready and available to establish a connection with a VTM. Alternatively, controller 307 may determine that a video agent is available when a video session between a VTM (and associated user) and a workstation (and associated video agent) has ended. Controller 307 may monitor the communication channel established between the VTM and video agent workstation. Alternatively, the VTM and/or video agent workstation may transmit a message to controller 307 indicating that the video session has ended and that the video agent is now available. In step 515, controller 307 may wait until a video agent becomes available. In step 520, when a video agent becomes available (step 515: Y), controller 307 may connect the requesting VTM to the available video agent. Thus, a video session between the requesting VTM and the video agent may be established when the requesting VTM is next in the preferred virtual queue and when a video agent is available.

FIG. 5B illustrates an example of at least a portion of a flow diagram for classifying a video transaction as a normal, high priority, and/or low priority transaction in which various aspects of the disclosure may be implemented. Normal, high priority, and/or low priority transactions may be classified as "default" transactions, which may receive lower priority than preferred transactions. If controller 307 classifies a transaction as a normal, high priority, and/or low priority transaction (e.g., steps 440, 450, and 455), controller 307 may perform the steps illustrated in FIG. 5B. In step 525, controller 307 may place a requesting user transaction (or VTM) in a default virtual queue. When the user transaction is next in the default virtual queue (e.g., step 530: Y), controller 307 may determine whether a preferred virtual queue is empty in step 535. The preferred queue may be one or more preferred queue as described in FIG. 5A. When the preferred virtual queue is empty (step 535: Y), controller 307, in step 540, may determine whether the user transaction is classified as a low priority transaction (e.g., as classified in step 455). If the user transaction is not classified as a low priority transaction (step 540: N), controller 307 may determine if a video agent is available in step 555. When a video agent becomes available (step 555: Y), controller 307 may connect the requesting VTM to the available video agent in step 570.

If the user transaction is classified as a low priority transaction (step 540: Y), controller 307 may determine if there are any high priority transactions available to be routed in step 545. For example, controller 307 may search the default queue for the next available transaction classified as high priority (e.g., a high priority transaction closest to the top of the default queue). As previously described, high priority transaction may be indicated by a high priority indicator, such as HI, *, and the like. If controller 307 does not find a high priority transaction (step 545: N), controller 307 may determine if a video agent is available in step 555. When a video agent becomes available (step 555: Y), controller 307 may connect the requesting VTM to the available video agent in step 570.

If controller 307 finds a high priority transaction (step 545: Y), controller 307 may move the current transaction classified as low priority within the default queue in step 550. For example, controller 307 may move the low priority transaction to the queue position of the first available high priority transaction identified in step 545. Alternatively, controller 307 may move the low priority transaction to the immediately following queue position. For example, if queue position 1 is the position of the first transaction in line in the default queue, controller 307 may move the low priority transaction from queue position 1 to queue position 2 (the second transaction in line in the default queue). Controller 307 may also move the low priority transaction a predefined number of positions from the low priority transaction's current position (e.g., from position 1 to position 6 if the predefined number is 5).

Alternatively, controller 307 may determine the low priority transaction's position based on the estimated visit time at the low priority transaction VTM. Controller 307 may move the low priority transaction to a position that keeps the estimated visit time at the low priority transaction VTM below a predetermined visit time threshold, such as a high end threshold, as previously described. For example, if the high end threshold is 10 minutes, controller 307 may move the low priority transaction to a position in the default queue that causes the visit time for the user associated with the low priority transaction to be at or below 10 minutes. For example, assume that the visit time includes a physical queue wait time (e.g., time in line), a virtual queue wait time (e.g., time in a virtual queue, such as the default queue), and a transaction time. Controller 307 may, for example, detect that the user's physical queue wait time is 2 minutes and virtual queue wait time is 3 minutes and estimate that the user's transaction time will be 2 minutes. Controller 307 may estimate the transaction time based on, for example, the average transaction time of all users at the VTM location, the user's transaction history, such as the most common transactions initiated at a particular time by the user, an indicator of the transaction type input by the user and transmitted to the controller by the VTM and an associated time estimate for the transaction type, and the like. In the above example, controller 307 may estimate the user's visit time to be 7 minutes (2 minute physical queue wait time+3 minute virtual queue wait time+2 minute transaction time).

Controller 307 may move the user transaction to a position within the default queue that maintains the user's estimated visit time at or below the high end threshold, 10 minutes. For example, if the high priority transaction moved to the low priority transaction queue position (e.g., to the top of the queue) is estimated to take 3 minutes, controller 307 may move the low priority transaction to the second position in the queue, which maintains the low priority transaction's estimated visit time at 10 minutes (7 minute estimated visit time had the low priority transaction been taken in turn+3 minute estimated transaction time for the high priority transaction that substitutes for the low priority transaction). As another example, if the high priority transaction is estimated to take 1 minute and the following transaction in the default queue is estimated to take 1.5 minutes, controller 307 may move the low priority transaction to the third position in the queue if the transaction following the 1.5 minute transaction is 1 minute, maintaining the low priority transaction's estimated visit time at 9.5 minutes (7 minute estimated visit time had the low priority transaction been taken in turn+1 minute estimated transaction time for the high priority transaction that substitutes for the low priority transaction+1.5 minute estimated transaction time for the following transaction in the default queue).

In step 560, controller 307 may change the classification of the low priority transaction to another classification, such as to a normal transaction. For example, controller 307 may change the classification identifier for the transaction from "LOW" to "NOR." The classification change may be based on one or more business rules (e.g., controller 307 changes the classification of the transaction to normal when the low priority transaction is moved, controller 307 changes the classification of the transaction when the low priority transaction is moved and based on the current visit time, wait time, and/or transaction time, and the like). In step 565, controller 307 may move the first available high priority transaction (e.g., as determined in step 545) to the first queue position in the default queue. Controller 307 may determine if a video agent is available in step 575. When a video agent becomes available (step 575: Y), controller 307 may connect the requesting VTM to the available video agent in step 570. Thus, a video session between a requesting VTM and a video agent may be established when the user transaction originating from the requesting VTM is next in the default virtual queue, when the preferred virtual queue is empty, when/if the user transaction is considered a normal, high priority, and/or low priority transaction, and/or when a video agent is available.

By placing users in various virtual queues, controller 307 may influence the visit time for each VTM by attempting to maintain the visit time within predetermined visit time thresholds (e.g., a high end visit time threshold and/or a low end visit time threshold). In particular, visit times at overloaded VTMs may be reduced by placing users of the overloaded VTMs in a default virtual queue and classifying the user transactions as high priority transactions. On the other hand, visit times at other VTMs may be slightly increased by classifying the user transactions of these VTMs as low priority transactions. For each VTM, controller 307 may attempt to maintain the average or maximum visit time below a high end visit time threshold, and in some instances, also above a low end visit time threshold.

Figure 6:
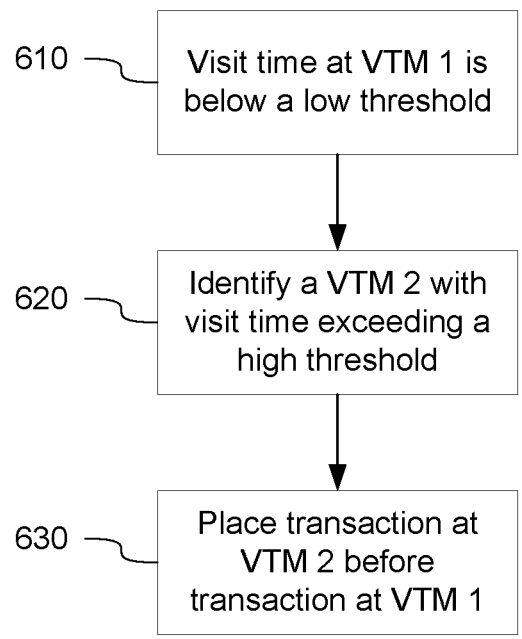
FIG. 6 illustrates an example of at least a portion of a flow diagram for decreasing a user visit time at a video teller machine in which various aspects of the disclosure may be implemented.

FIG. 6 illustrates an example of at least a portion of a flow diagram for decreasing a user visit time in which various aspects of the disclosure may be implemented. In step 610, controller 307 may determine that a visit time at VTM 1 is below a predetermined low end visit time threshold (e.g., 2 minutes). In step 620, controller 307 may identify a second VTM (VTM 2) having a visit time exceeding a predetermined high end visit time threshold (e.g., 10 minutes).

In step 630, controller 307 may place a transaction request from VTM 2 before a transaction request from VTM 1 in a virtual queue (e.g., one of the default and preferred queues). For example, if a transaction request from VTM 1 is at a third position in a virtual queue, controller 307 may place the transaction request from VTM 2 at the third position, shifting the transaction request from VTM 1 to a fourth position in the queue. The transaction request from VTM 1 may also be placed at any position in the virtual queue, such as the previous position of the VTM 2 transaction, a predetermined number of positions after the third position, and the like. Thus, controller 307 may prioritize the transaction request from VTM 2 over the transaction request from VTM 1 even if the transaction request from VTM 1 occurred before the transaction request from VTM 2.

Controller 307 may maintain the visit time at VTM 1 below a predetermined high end visit time threshold, and in some instances, between the high end threshold and a low end visit time threshold. For example, prior to placing the VTM 2 transaction before the VTM 1 transaction in the queue, controller 307 may determine whether placing the VTM 2 transaction before the VTM 1 transaction will increase the visit time at VTM 1 above the predetermined high end threshold. If the visit time at VTM 1 would exceed the threshold, controller 307 might not place the VTM 2 transaction before the VTM 1 transaction (step 630). Instead, controller 307 may identify a third VTM, VTM 3, and determine whether the VTM 2 transaction may be prioritized over a VTM 3 transaction while maintaining the visit time at both VTM 2 and VTM 3 below the high end visit time threshold (and in some instances, between the high end threshold and the low end threshold).

FIG. 7 illustrates an example of physical queues at one or more transaction locations in which various aspects of the disclosure may be implemented. These example physical queues may include six VTM locations 730 (A-F). At VTM location A, 6 users (e.g., A2-A7) may be in line, and one user may be at the VTM device (e.g., A1). At VTM location B, one user may be in line (e.g., B2), and one user may be at the VTM device (e.g., B1). At VTM location C, one user may be in line (e.g., C2), and one user may be at the VTM device (e.g., C1). At VTM location D, one user may be in line (e.g., D2), and one user may be at the VTM device (e.g., D1). At VTM location E, two users may be in line (e.g., E2 and E3), and one user may be at the VTM device (e.g., E1). At VTM location F, one user may be at the VTM device (e.g., F1), and the VTM line might not include any other users. Furthermore, based on the estimated average or maximum visit times at each VTM location, controller 307 may classify VTM A as high priority, VTMs B-D as low priority, VTM E as normal, and VTM F as preferred.

FIG. 8 illustrates an example of a first-come, first-served queuing model in which various aspects of the disclosure may be implemented. Model 800 may be represented as data generated and/or manipulated by, e.g., controller 307 and/or another computing device. Furthermore, example model 800, which corresponds to the example physical queues of FIG. 7, may include three virtual queue positions 820, indicated as Q1-Q3. Additional virtual queue positions 820 may also be included to accommodate additional users placed in the virtual queue. In model 800, service may be first-come, first served. For example, the first users at VTM locations A, B, and C (e.g., users A1 (in position 830), B1, and C1) may be served by video agents VA 1, VA 2, and VA 3 (810) first. When the first users at VTM locations A, B, and C complete their transactions, controller 307 may connect the video agents VA 1, VA 2, and VA 3 to the first users at VTM locations D, E, and F (e.g., users D1, E1, and F1). Thus, in this example first-come, first-served model 800, users may be served in the following order: ABCDEFAB-CDEAAEAAA. Assuming that the average transaction time between a user and a video agent in the example model 800 is 1 minute, the maximum visit time 840 may occur at VTM location A (e.g., 8 minutes for user A7). If the predetermined high end visit time threshold is 8 minutes, the servicing order illustrated in example model 800 might be sufficient to satisfy the threshold requirement. However, if the predetermined visit time threshold is 7 minutes, the servicing order illustrated in example model 800 might not be sufficient. Thus, controller 307 may reduce the visit time at VTM location A by re-prioritizing requested transactions at VTM locations A-F. FIG. 9 illustrates an example re-prioritization.

FIG. 9 illustrates an example of a dynamic routing queuing model in which various aspects of the disclosure may be implemented. Model 900 may be represented as data generated and/or manipulated by, e.g., controller 307 and/or another computing device. Similar to model 800, example model 900 may include three video agents 910 (VA 1, VA 2, and VA 3), six VTM locations 930 (A-F), and three queue positions 920. Additional queue positions 920 may also be included to accommodate additional users placed in the virtual queue. In model 900, controller 307 may balance VTM location A with the remainder of the video transaction system (e.g., with VTM locations B-F) by considering the classification of the VTM locations (e.g., low priority, high priority, normal, and/or preferred). For example, controller 307 (by performing the steps illustrated in FIG. 5A) may connect user $\mu$1 to the first available video agent (VA 1) because user F1's transaction has been classified as preferred (and no other transaction have been classified as preferred). Controller 307 may connect user transaction A1 to the next available video agent (VA 2) when A1 is the first transaction in the default queue. For example, referring back to FIG. 5B, user transaction A1 may be placed in a default queue in step 525, with an indicator that user transaction A1 is a high priority transaction (e.g., USERA1-HI, USERA1*, and the like). In step 530, controller 307 may determine that transaction A1 is next in the default queue. In step 535, controller 307 may determine that the preferred queue is empty (e.g., when transaction F1 is being serviced by VA 1 and is no longer in the preferred queue). In step 540, controller 307 may determine, based on transaction A1's indicator, that transaction A1 is not a low priority transaction. In step 555, controller 307 may determine that a video agent VA 2 is available. In step 570, controller 307 may connect VTM A/user transaction A1 to video agent VA 2, as indicated by reference number 931 in FIG. 9. Controller 307 may also connect VTM B and user transaction B1 to video agent VA 3, as indicated by reference number 932. Controller 307 may place transaction C1 in a first queue position (933), transaction D1 in a second queue position (934), and transaction E1 in a third queue position (935). Transaction A2 may also be placed in a fourth queue position (e.g., Q4, not shown) if transaction A1 at VTM A has been completed and transaction A2 has been initiated.

When a video agent, such as VA 1, becomes available, controller 307 may query the virtual queue (920) to determine which transaction to connect to the available video agent. Because transaction C1 is in the first virtual queue position (933), controller 307 may perform the steps illustrated in FIG. 5B to determine whether to connect transaction C1 to VA 1. In step 530, controller 307 may determine that transaction C1 is next in the default queue. In step 535, controller 307 may determine that the preferred queue is empty. In step 540, controller 307 may determine, based on transaction C1's indicator, that transaction C1 is a low priority transaction (step 540: Y). In step 545, controller 307 may determine whether a high priority transaction is available in the virtual queue. Transactions D1 in the second queue position (934) and transaction E1 in the third queue position (935) are low priority transactions. Transaction A2 in the fourth queue position (e.g., Q4, not shown), on the other hand, may be a high priority transaction. In step 550, controller 307 may move low priority transaction C1 to another queue position (e.g., the next queue position (Q2), the queue position ceded by A2 (Q4), and the like). In step 560, controller 307 may change the classification of transaction C1 to another classification, such as a normal transaction classification. In step 565, controller 307 may move high priority transaction A2 to the first queue position (Q1) ceded by transaction C1. In step 575, controller 307 may determine that video agent VA 1 is available and connect VTM A/transaction A2 to the available video agent in step 570 (as indicated by reference number 936 in FIG. 9).

Thus, in the example dynamic routing model 900, users may be served in the following order: FABADEABCAED-CAEAA. Assuming that the average transaction time between a user and a video agent in the example model 900 is 1 minute, the maximum visit time 940 (7 minutes) may occur at VTM location A (for user A7). Thus, by performing dynamic routing, controller 307 may reduce the visit time at VTM location A from 8 minutes (as illustrated in FIG. 8) to 7 minutes (as illustrated in FIG. 9). By re-prioritizing transactions, controller 307 may reduce visit times at one or more VTM locations to at or below a predetermined high end visit time threshold.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   determining, by a computing device having at least one processor, a wait time of a user at a video transaction machine;
   determining, by the computing device, an amount of time the user spent waiting in line for the video transaction machine;
   determining, based on the determined wait time of the user at the video transaction machine and the determined amount of time the user spent waiting in line for the video transaction machine, that a visit time associated with the video transaction machine exceeds a visit time threshold;
   determining, by the computing device, a maximum estimated visit time for a last user in line for the video transaction machine;
   determining, by the computing device, that the maximum estimated visit time for the last user exceeds a maximum visit time threshold; and
   in response to determining that the visit time associated with the video transaction machine exceeds the visit time threshold and in response to determining that the maximum estimated visit time for the last user in line for the video transaction machine exceeds the maximum visit time threshold, placing, by the computing device, a request for the video transaction machine received from the video transaction machine at a position in a queue for video transaction resources before another request for the video transaction resource received from another video transaction machine.

2. The method of claim 1, wherein the wait time of the user at the video transaction machine comprises an amount of time from a time that the video transaction machine receives an input from the user requesting assistance from the video transaction machine to a current time.

3. The method of claim 1, wherein determining the amount of time the user spent waiting in line for the video transaction machine comprises:
   receiving, from a user device having one or more wireless sensors, data indicating a presence of the user in the line for the video transaction machine, wherein the user device is carried by the user; and
   determining the amount of time the user spent waiting in line for the video transaction machine based on the data received from the user device having the one or more wireless sensors.

4. The method of claim 1, wherein determining the maximum estimated visit time for the last user in line for the video transaction machine is based on an average visit time associated with the video transaction machine and a total number of users in line for the video transaction machine.

5. The method of claim 1, further comprising:
   using a presence sensor at a location of the video transaction machine to determine that a user has joined or left the line for the video transaction machine; and
   in response to determining that a user has joined or left the line for the video transaction machine, re-determining, by the computing device, the maximum estimated visit time for the last user in line for the video transaction machine.

6. The method of claim 1, wherein determining the amount of time the user spent waiting in line for the video transaction machine further comprises:

generating, by the computing device and based on information received by the computing device from an image sensor at a location of the video transaction machine, a physical queue indicating amounts of time users at the location of the video transaction machine spend waiting in line for the video transaction machine, including the amount of time the user spent waiting in line for the video transaction machine; and determining, by the computing device and based on the physical queue, the amount of time the user spent waiting in line for the video transaction machine.

7. The method of claim 1, wherein the video transaction resource comprises a video agent, the method further comprising:

in response to determining that the video agent is available and that the request for the video transaction resource received from the video transaction machine is next in the queue for video transaction resources, generating a communication channel between the video transaction machine and the video agent.

8. An apparatus, comprising:
at least one processor; and
memory storing computer-readable instructions that, when executed by the at least one processor, cause the apparatus to:
  determine a wait time of a user at a video transaction machine;
  determine an amount of time the user spent waiting in line for the video transaction machine;
  determine, based on the determined wait time of the user at the video transaction machine and the determined amount of time the user spent waiting in line for the video transaction machine, that a visit time associated with the video transaction machine exceeds a visit time threshold;
  determine a maximum estimated visit time for a last user in line for the video transaction machine;
  determine that the maximum estimated visit time for the last user exceeds a maximum visit time threshold; and
  in response to determining that the visit time associated with the video transaction machine exceeds the visit time threshold and in response to determining that the maximum estimated visit time for the last user in line for the video transaction machine exceeds the maximum visit time threshold, place a request for the video transaction machine received from the video transaction machine at a position in a queue for video transaction resources before another request for the video transaction resource received from another video transaction machine.

9. The apparatus of claim 8, wherein the wait time of the user at the video transaction machine comprises an amount of time from a time that the video transaction machine receives an input from the user requesting assistance from the video transaction machine to a current time.

10. The apparatus of claim 8, wherein determining the amount of time the user spent waiting in line for the video transaction machine comprises:

receiving, from a user device having one or more wireless sensors, data indicating a presence of the user in the line for the video transaction machine, wherein the user device is carried by the user; and determining the amount of time the user spent waiting in line for the video transaction machine based on the data received from the user device having the one or more wireless sensors.

11. The apparatus of claim 8, wherein determining the maximum estimated visit time for the last user in line for the video transaction machine is based on an average visit time associated with the video transaction machine and a total number of users in line for the video transaction machine.

12. The apparatus of claim 8, wherein the memory stores computer-readable instructions that, when executed by the at least one processor, cause the apparatus to:

use a presence sensor at a location of the video transaction machine to determine that a user has joined or left the line for the video transaction machine; and in response to determining that a user has joined or left the line for the video transaction machine, re-determine the maximum estimated visit time for the last user in line for the video transaction machine.

13. The apparatus of claim 8, wherein determining the amount of time the user spent waiting in line for the video transaction machine further comprises:

generating, based on information received from an image sensor at a location of the video transaction machine, a physical queue indicating amounts of time users at the location of the video transaction machine spend waiting in line for the video transaction machine, including the amount of time the user spent waiting in line for the video transaction machine; and determining, based on the physical queue, the amount of time the user spent waiting in line for the video transaction machine.

14. The apparatus of claim 8, wherein the video transaction resource comprises a video agent, and wherein the memory stores computer-readable instructions that, when executed by the at least one processor, cause the apparatus to:

in response to determining that the video agent is available and that the request for the video transaction resource received from the video transaction machine is next in the queue for video transaction resources, generate a communication channel between the video transaction machine and the video agent.

15. At least one computer-readable storage medium having computer-executable instructions stored thereon that, when executed, cause at least one computing device to:
  determine a wait time of a user at a video transaction machine;
  determine an amount of time the user spent waiting in line for the video transaction machine;
  determine, based on the determined wait time of the user at the video transaction machine and the determined amount of time the user spent waiting in line for the video transaction machine, that a visit time associated with the video transaction machine exceeds a visit time threshold;
  determine a maximum estimated visit time for a last user in line for the video transaction machine;
  determine that the maximum estimated visit time for the last user exceeds a maximum visit time threshold; and
  in response to determining that the visit time associated with the video transaction machine exceeds the visit time threshold and in response to determining that the maximum estimated visit time for the last user in line for the video transaction machine exceeds the maximum visit time threshold, place a request for the video transaction machine received from the video transaction machine at a position in a queue for video transaction resources before another request for the video transaction resource received from another video transaction machine.

16. The at least one computer-readable storage medium of claim 15, wherein the wait time of the user at the video transaction machine comprises an amount of time from a time that the video transaction machine receives an input from the user requesting assistance from the video transaction machine to a current time.

17. The at least one computer-readable storage medium of claim 15, wherein determining the amount of time the user spent waiting in line for the video transaction machine comprises:
receiving, from a user device having one or more wireless sensors, data indicating a presence of the user in the line for the video transaction machine, wherein the user device is carried by the user; and
determining the amount of time the user spent waiting in line for the video transaction machine based on the data received from the user device having the one or more wireless sensors.

18. The at least one computer-readable storage medium of claim 15, wherein determining the maximum estimated visit time for the last user in line for the video transaction machine is based on an average visit time associated with the video transaction machine and a total number of users in line for the video transaction machine.

19. The at least one computer-readable storage medium of claim 15 having additional computer-readable instructions stored thereon that, when executed, cause the at least one computing device to:
use a presence sensor at a location of the video transaction machine to determine that a user has joined or left the line for the video transaction machine; and
in response to determining that a user has joined or left the line for the video transaction machine, re-determine the maximum estimated visit time for the last user in line for the video transaction machine.

20. The at least one computer-readable storage medium of claim 15, wherein determining the amount of time the user spent waiting in line for the video transaction machine further comprises:
generating, based on information received from an image sensor at a location of the video transaction machine, a physical queue indicating amounts of time users at the location of the video transaction machine spend waiting in line for the video transaction machine, including the amount of time the user spent waiting in line for the video transaction machine; and
determining, based on the physical queue, the amount of time the user spent waiting in line for the video transaction machine.

\* \* \* \* \*